(12) United States Patent
Gebauer et al.

(10) Patent No.: US 6,871,988 B2
(45) Date of Patent: Mar. 29, 2005

(54) LAMP FOR VEHICLES

(75) Inventors: Matthias Gebauer, Reutlingen (DE); Petra Heinbuch, Stuttgart (DE); Kurt Schuster, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 10/303,340

(22) Filed: Nov. 25, 2002

(65) Prior Publication Data

US 2003/0099113 A1 May 29, 2003

(30) Foreign Application Priority Data

Nov. 28, 2001 (DE) .......................................... 101 58 336

(51) Int. Cl.$^7$ ................................ F21V 7/04; F21V 8/00
(52) U.S. Cl. ........................ 362/511; 362/307; 362/551
(58) Field of Search .............................. 362/26, 27, 30, 362/31, 307, 511, 551, 560

(56) References Cited

U.S. PATENT DOCUMENTS

| | | | | |
|---|---|---|---|---|
| 5,047,761 A | * | 9/1991 | Sell .............................. 362/30 |
| 5,899,552 A | * | 5/1999 | Yokoyama et al. ........... 362/31 |
| 6,015,200 A | * | 1/2000 | Ogura ............................. 347/3 |
| 6,193,383 B1 | * | 2/2001 | Onikiri et al. ................. 362/26 |
| 6,607,286 B2 | * | 8/2003 | West et al. ..................... 362/26 |

FOREIGN PATENT DOCUMENTS

DE      197 39 173 A1     3/1999

* cited by examiner

*Primary Examiner*—Alan Cariaso
(74) *Attorney, Agent, or Firm*—Michael J. Striker

(57) ABSTRACT

A lamp for vehicles, in particular motor vehicles, has a light source and at least one light-guide arrangement associated with the light source for guiding the light radiated by the light source and coupled into the light-guide arrangement in a specified direction toward an outcoupling point. The lamp further has a light-diverting device in the light-guide arrangement for diverting and/or splitting the light. The light-diverting device is formed as a recess in the light-guide arrangement, and the diversion takes place by means of reflecting the light on one of the lateral surfaces of the recess. The recess is closed by means of a cover element, such that the recess is covered as viewed from the outside of the light-guide arrangement.

8 Claims, 2 Drawing Sheets

LAMP FOR VEHICLES

BACKGROUND OF THE INVENTION

The present invention relates to a lamp for vehicles, in particular, motor vehicles, with a light source and at least one light-guide arrangement associated with the light source for guiding the light radiated by the light source and coupled into the light-guide arrangement in a specified direction toward an outcoupling point. The lamp further has a light-diverting device in the light-guide arrangement for diverting and/or splitting the light, whereby the light diverting device is formed as a recess in the light-guide arrangement and the diversion takes place by means of reflecting the light on one of the lateral surfaces of the recess.

A lamp of this type is know from DE 197 39 173 A1, which discloses a signal lamp for a vehicle, in particular, a motor vehicle, with a housing, in which at least one light source is disposed, with a light guide in which the light is guided in the direction of a specified light exit opening, whereby the light outcoupling element is associated with a light diverting element, which on its front side, has a depression for diverting at approximately 90° and splitting into two legs the light radiated from the light source, whereby the depression is formed as a groove or slot with groove surfaces.

In particular, the known arrangement is made up of a light guide, in which the light is coupled in via a light source, whereby the light guide has a substantially circular cross section and has a groove or slot on one of its faces. On the lateral surfaces of the light guide, which here serves as a light diverting element, light outcoupling elements are mounted in the region of the groove, in which the light is diverted after striking the groove surfaces. The light outcoupling elements are the visible part of the light.

One disadvantage of this type of construction is the unattractive exterior of the groove, which disturbs the appearance of the light guide, which, for example, can be connected to a ring. It can particularly be provided that the light is lead guided via a light guide, diverted on the groove surfaces, and than guided in a ring-shaped light guide, via which it is outcoupled over the entire ring circumference. The outcoupling point in the ring, therefore, can be seen from the outside by motor vehicle headlights through the cover disk, in particular, when clear cover disks without optics are used based on design grounds.

It is therefore an object of the present invention to provide a lamp, in which the coupling in- and diverting points do not detract from the appearance.

SUMMARY OF THE INVENTION

The present invention resolves the above-described problems by a lamp, which the recess is covered as viewed from the outside of the light-guide arrangement.

This type of arrangement offers the advantage that the recess cannot be seen from the outside of the light-guide arrangement, and therefore, for example, the groove or prism creates no negative optical affect on the appearance of a light-guide ring, for example, which is arranged about a regular low beam head light, for example.

If one looks through the cover plate of a front Kfz headlight, for example, the individual light modules can be recognized. In this connection, it can be provided, for example, that such a light-guide ring can be around about a light module. The light guide can therefore be made from a transparent material, in particular, a plastic material, so that a particularly attractive optical exterior is provided, based on the transparent construction of the light guide, in particular, however, based on its regular construction, since the coupling in of the light must not take place in the direct vicinity of the light guide ring.

Essentially, light guides have the advantage of relatively free construction of elongated lights, such as, for example, border or blinker light lamps, without, however, the need to use expensive glass fibers. In addition, the coupling in of light from LED's, for example, is possible, so that a white light color can be achieved.

The light-guide arrangement, therefore, can be circular or oval in cross section; however, also square shapes are possible.

The advantage lies in that this type of signal lamp means no reflector surface damage and therefore, no light output damage, as far as they are coupled as signal lamps with a further lamp. Typically, these types of signal lamps otherwise are provided in recesses in the reflector of a headlight.

With the assistance of one of these types of light guides, in particular, desired elongated shapes can be realized, which, in addition, enable them to be positioned as desired within a headlight. Therefore, the use of light-guide arrangements offers an entirely new spectrum for design possibilities.

The light-guide made from a transparent material thereby guides the light further, as far no outcoupling elements are provided, as non-dissipative as possible. On the side of the light guide, which is opposite to the outcoupling side, prisms are arranged, for example, for outcoupling, by means of which the light in the direction of the outcoupling side can be outcoupled by reflection or total reflection.

In particular, it can be provided that the light guide can be positioned about the headlight reflector, or the projection lens with PES modules. In this manner, an interesting and attractive optical effect can be achieved with motor vehicles.

As a principle, it can be provided that the prisms, which serve as outcoupling elements, depending on the reflective characteristics, can have a different prism angle and/or a different prism form, such as concave, convex, or a free-form surface.

The light coupling-in therefore can be achieved by means of all possible lamps or light-producing units, for example, by means of incandescent lamps, halogen lamps, LED's, EL foils, or glow-discharge lamps.

The light coupling therefore can be achieved via a reflector in a glass or plastic fiber. The plastic fiber, then, is coupled to the light guide. In cases in which the light coupling is to take place directly in the light guide, an infrared filter can be provided, in order to protect the light guide from the heat rays that are emitted from the light element.

It can therefore be provided that the light source is associated with a reflector, whereby the focus of the reflector essentially lies on the coupling-in point in the light guide, or in the glass fiber connected in front to it, in order to enable guiding over the largest possible light portion of the light source into the light guide.

The infrared filter, or the coupling of a suitable glass fiber, can be eliminated when the light source is so adapted, that it does not destroy the light guide. LED's are particularly suitable in this regard. The LED, therefore, can be placed directly on the end of a light guide; however, it can also be provided, in order to improve the coupling-in efficiency, that one can place a small reflector on the LED, which seals with the light guide. In this regard, it is ensured that approximately all of the light emitted from the LED is coupled-in in the light guide.

In particular, by means of an essentially loss-free guiding of the light into the light-guide arrangement, as far as no outcoupling element are provided, the light coupling-in can take place on at a completely different point than the light outcoupling. In this manner, the optics in the headlight housing can be improved so that, for example, the light coupling-in in the light guide is still not visible in the headlight from the outside. Also, the correct limited construction space in the headlight can be used optimally.

In addition, the light guide has the advantage that it is able to be bent as desired, and the respective light is diverted.

According to a first embodiment, it can be provided that the recess has the shape of a prism or cuboid. It is also contemplated, however, that other forms can be used, for example, cones, truncated pyramids, or truncated cones.

To improve the light reflection on the light-diverting device, which forms the recess, since on the side edges of the recess that form the border surfaces between the light guide and a further material, the reflection takes place, which leads to diversion, it can be provided that the lateral surfaces of the recess are mirrored or partially mirrored or are coated in another manner.

It can therefore be provided that the cover element is an insert, which has the same size and contour as the recess. For example, then, in a pyramid-shaped recess, a pyramid-shaped insert would be used, which either permits merely a smaller air gap between the recess and the insert, or which sufficiently lies against the lateral walls of the recess. In particular, the insert should be flush with the outside of the light-guide arrangement, so that here, a unitary upper-surface appearance is produced.

Alternatively, it can be provided that the cover element does not correspond completely with the size and contour of the recess. For example, then, it can be provided that the insert is arranged merely in the region of the recess, and there, corresponds to the contour, which forms the outside of the recess. It then can comprise a greater, desired formed intermediate space between the insert and the recess, whereby the shape of the intermediate space is determined by the shape of the recess on the one hand, and on the other hand, by the upper surface of the insert to be directed on the recess.

According to another embodiment of the present invention, the insert can be developed out of a different material than the light-guide arrangement, for example, in order to improve the reflective qualities. The insert can therefore be interconnected with the light-guide arrangement in a bonded fashion, or the insert can be connected with the light-guide arrangement in a positive-locking or inter-locking manner. In many cases, however, the insert can be adhered into the recess, or example. In particular, it can be provided also that the insert is cast into the light-guide arrangement. In this manner, the insert can be directly cast upon the manufacturing of the light-guide arrangement and so is securely retained in the light-guide arrangement. In this manner, it is ensured that the surfaces are particularly well aligned with one another. For example, it can be provided that the insert is completely surrounded by the light-guide arrangement. This is, it can be provided that the insert does not coincide with the outer side of the light-guide arrangement, rather is arranged further within the interior of the light-guide arrangement. In addition, in this manner, a particularly secure attachment is achieved.

However, basically the insert can also be made from the same material as the light-guide arrangement.

It can be provided further in another particularly preferred embodiment, that none of the lateral surfaces of the recess coincide with an outer side of the light-guide arrangement. The recess represents, then, a "hole" in the light-guide. The recess is therefore completely enclosed in cross section by the light-guide arrangement.

In this manner, it can particularly easily realized that the outer surfaces and, therewith, the appearance of the light is not detrimentally affected. In particular, also no material differences can be seen by the eye, or not the side edges and therewith, the border surfaces.

DETAILED DESCRIPTION OF THE PREFERRED EMBODIMENTS

Figure 1:
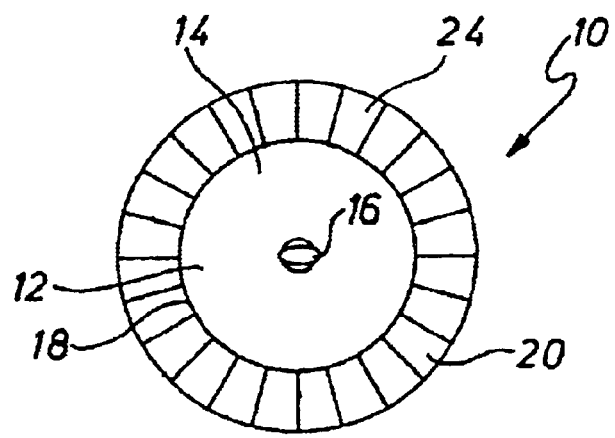
FIG. 1 is a front view of a headlight with a light-guide arrangement on the periphery.

FIG. 1 shows a headlight 10 (in a largely schematic illustration) of a motor vehicle with a first lamp 12 including a reflector 14, as well as a first light source 16, which is arranged in the focal point of the reflector 14.

About the reflector's outer edge 18, a light guide 20 as a part of a light-guide arrangement 20 is provided as an elongated light outcoupling element, which extends circular or ring-shaped along the periphery of the reflector 14. For the light guide arrangement 20, a further light source (not shown) is provided, which cannot be seen upon looking at the headlight housing from the outside, whereby the coupling-in of the light in the circular light guide 20 takes place via a coupling-in element and a light-diverting device, which is shown, for example, in FIGS. 2 and 3.

The outcoupling of the light takes place by means of regular, arranged reflection surfaces 22, preferably directly connected to one another, whereby the reflection surfaces 22 are the lateral surfaces of prisms 24. The prisms are arranged on the side of the light guide opposite to the light outcoupling surface. On the prisms, the incident light is reflected, such that it exits on the opposite side, that is, the light outcoupling side, from the light guide arrangement 20. The light outcoupling side is the side 28 in the direction of a cover place of a headlight.

If the light is coupled-in in the light-guide arrangement in such a manner that the light source in FIG. 1 is found in a plate behind that illustrated, then it is necessary to consider light diversion, for example, light-diversion surfaces in the form of a recess or prisms. Such a type of recess in the light guide arrangement 20, however, in the illustration of FIG. 1, is to be viewed as breaks or interruptions of the circular appearance of the light guide in the illuminated and non-illuminated state. Such an interruption, however, is undesired based on design considerations.

Figure 2:
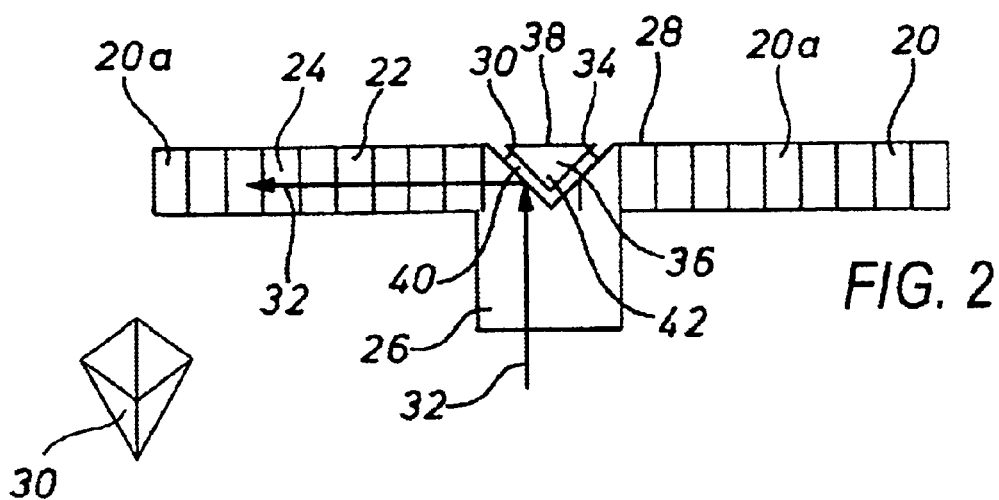
FIG. 2 is a side view of a first light-diverting device.
Figure 3:
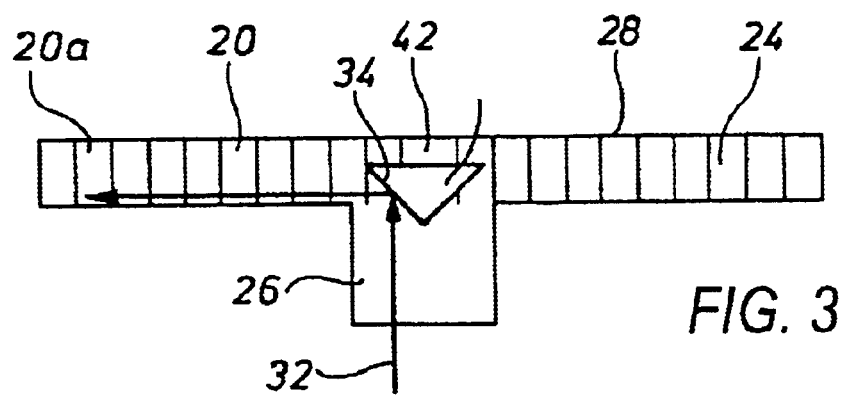
FIG. 3 is a side view of a second light-diverting device.

FIGS. 2 and 3 shows alternative embodiments for avoiding this type of interruption in the visible side 28 of the light guide arrangement 20, whereby the visible side 28 is the illustrated side in FIG. 1.

In FIG. 2, a light guide arrangement 20 is illustrated, whose comprises a circular outcoupling part 20a, whereby, in this manner, merely the two outgoing arms from the coupling-in point of the light in the circular ring can be seen. These join together to a ring (not shown).

In the area of the light coupling-in in the light guide arrangement 20 from a first coupling-in component 26 of the light guide in the light outcoupling part 20a, a recess 30 is provided on a visible side 28 of the light guide 20, which is mirrored for improved reflection of the light. A light beam 32, which from a light coupling-in point (not shown) is guided through the light guide and contacts on the lateral surfaces 34 (reflection surfaces) of the recess 30 formed as a prism, is reflected by means of the lateral surfaces such that the light beam is diverted in the outcoupling part 20a of the light guide arrangement 20. In this manner, the light loss upon the reflection should be the smallest possible.

So that the recess 30 in the visible side 28 cannot be seen, a prism which forms an insert 36 is placed in the recess 30, which, with regard to shape and contour, is minimally smaller than the shape and contour of the recess 30. In particular, however, the outer side 38 and the insert 36 is interconnected in a bonded fashion with the visible side 28 of the light-guide arrangement.

In this manner, only a small column or gap 40 exists between the recess 30 and the insert 36, so that the outer appearance of the light-guide ring 20 essentially is not disturbed. The inserted prism 36, therefore, can be made from the same material as the light-guide arrangement 20 or also can be made from another material.

In particular, with the use of the same material, however, a particularly remarkable appearance of the insert 36 is provided. The insert can be interconnected with the light-guide arrangement 20 in bonded fashion. It can be cast into the light-guide arrangement.

According to a second embodiment, it can be provided that the recess 30 is in the form of a "hole" in the light-guide arrangement and in the illustrated view, is surrounded by all sides by the light-guide arrangement 20.

In this case, it is not necessary to provide an insert 36, so that the visible side 38 has no interruption. In addition, the visible side is here continuous. Through the working-in of the outcoupling prism directly into the light-guide arrangement 20, the appearance of the ring is not disturbed. Here, the visible side 28 of the light-guide arrangement 20 itself serves as the cover element 42.

Figure 4:
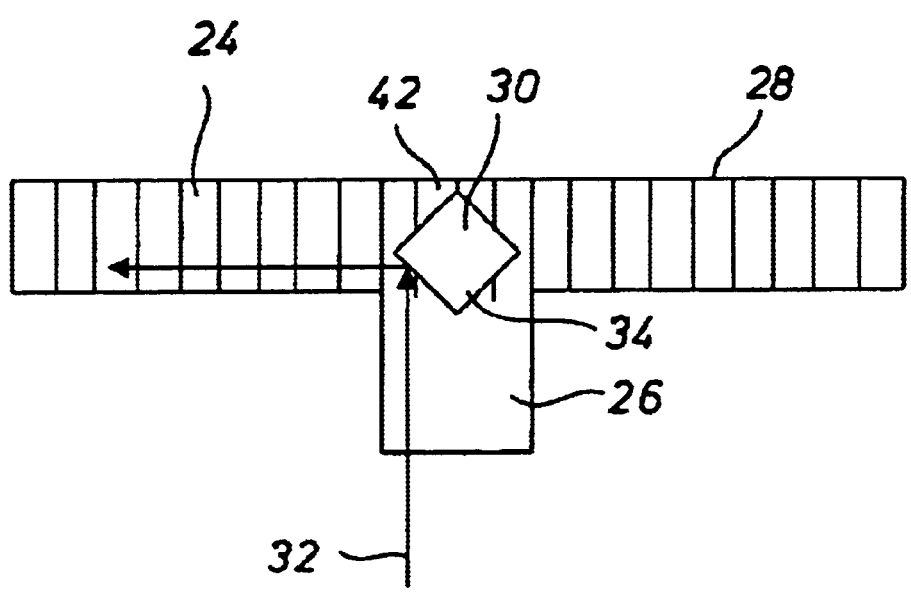
FIG. 4 is a side view of a third light-diverting device.

The recess 30 is provided here again in the form of a prism or cuboid shown in FIG. 4.

Because none of the lateral surfaces 34 of the recess coincide with the visible side 28, or the outer side of the light-guide arrangement 20, the visible side 28 of the light-guide arrangement remains completely uninterrupted, so that it cannot be recognized how the light is guided into the ring-shaped light-guide arrangement.

By way of example, also here a light beam 32 is shown.

The light 32, which is coupled-in by means of the coupling-in component 25 of the light-guide arrangement and which is diverted by means of the recess 30 in the outcoupling part 20a of the light-guide arrangement, runs along the bend of the light guide, whereby a reflection on the lateral walls of the light guide along its shape takes place. An outcoupling takes place again via the outcoupling prism 24, which lies opposite to the outcoupling side, which corresponds to the visible side 28.

It will be understood that each of the elements described above, or two or more together, may also find a useful application in other types of constructions differing from the types described above.

While the invention has been illustrated and described herein as a lamp for vehicles with a light source and at least one light-guide arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

What is claimed is:

1. A lamp for vehicles, in particular motor vehicles, having a light source and at least one light-guide arrangement (20) associated with the light source for guiding a light (32) radiated by the light source and coupled in the light-guide arrangement (20) in a specified direction toward an outcoupling point, and having a light-diverting device in the light-guide arrangement (20) for diverting and splitting the light (32), whereby the light-diverting device is designed as a recess (30) in the light-guide arrangement (20), and the diverting and splitting of the light takes place by means of reflecting the light (32) on a plurality of lateral surfaces (34) of the recess (30),
wherein the recess (30) is covered by a cover element (42) formed as an insert (36) in such a fashion that the recess (30) is covered as viewed from the outside (28) of the light-guide arrangement (20),
wherein the insert (36) is interconnected with the light-guide arrangement (20) in bonded fashion.

2. The lamp according to claim 1, wherein the recess (30) has the shape of a prism or cuboid.

3. The lamp according to claim 1, wherein the insert (36) has the same size and contour as the recess (30).

4. The lamp according to claim 3, wherein the insert (36) is developed out of a different material than the light-guide arrangement (20).

5. The lamp according to claim 3, wherein a gap (40) remains between the recess (30) and the insert (36).

6. The lamp according to claim 3, wherein the insert (36) is cast into the light-guide arrangement (20).

7. The lamp according to claim 1, wherein the recess (30) is built into the light-guide arrangement (20) in such a fashion that none of the lateral surfaces (34) of the recess (30) meets an exterior surface (20) of the light-guide arrangement (20).

8. The lamp according to claim 1, wherein the recess (30) and/or the cover element (42) is mirrored or partially mirrored.

* * * * *